United States Patent [19]
Cogar et al.

[11] 3,807,614
[45] Apr. 30, 1974

[54] BACKSPACE MECHANISM FOR A TAPE HANDLING APPARATUS FOR A DATA RECORDER

[75] Inventors: George R. Cogar, Frankfort; Torjkell Sekse, Marcy; Walter Banziger; Joseph W. Ming, both of Utica; Laszlo Horvath, Ilion, all of N.Y.

[73] Assignee: Mohawk Data Sciences Corporation, Herkimer, N.Y.

[22] Filed: May 5, 1970

[21] Appl. No.: 46,571

Related U.S. Application Data

[62] Division of Ser. No. 786,526, Nov. 18, 1968, Pat. No. 3,578,257.

[52] U.S. Cl. .................................... 226/49, 226/154
[51] Int. Cl. ............................................ B65h 17/20
[58] Field of Search ........ 226/49, 50, 153, 154, 116

[56] References Cited

UNITED STATES PATENTS

| | | | |
|---|---|---|---|
| 1,590,777 | 6/1926 | Oliver | 226/116 |
| 2,027,916 | 1/1936 | Lasker | 101/93 |
| 3,268,141 | 8/1966 | Rothlisberger | 226/154 |
| 3,406,627 | 10/1968 | Becker | 101/232 |

*Primary Examiner*—Richard A. Schacher
*Attorney, Agent, or Firm*—Richard H. Smith; Robert R. Hubbard

[57] ABSTRACT

A backspace mechanism for a tape handling apparatus for a data recorder comprising a pair of adjacent rollers. One of the rollers has a relieved portion on its circumference which is normally positioned so that the tape passes freely between the rollers. The relieved roller is connected to a continuously rotating drive means via a clutch including a shouldered cam, a rocker arm normally biased into blocking engagement with the cam and a shaft connecting the relieved roller and cam. In order to backspace the tape an increment, a solenoid momentarily moves the rocker arm to free the cam and rotate the relieved roller so that its unrelieved portion frictionally engages the tape between itself and the other roller.

6 Claims, 9 Drawing Figures

GEORGE R. COGAR
TORKJELL SEKSE
WALTER BANZIGER
JOSEPH W. MING
LASZLO HORVATH
*INVENTORS.*

Attorneys

BACKSPACE MECHANISM FOR A TAPE HANDLING APPARATUS FOR A DATA RECORDER

This is a division of application, Ser. No. 786,526, filed Nov. 18, 1968, now issued as U.S. Pat. No. 3,578,257 for TAPE HANDLING APPARATUS FOR DATA RECORDER. Ser. No. 786,526 is itself a division of application, Ser. No. 541,450, filed Mar. 30, 1966, now U.S. Pat. No. 3,483,523 for DATA RECORDING AND VERIFYING MACHINE.

This invention relates generally to computing apparatus, and has particular reference to a novel data recording machine in which a series of characters keyed into the machine is subsequently recorded on magnetic tape or compared against a series of characters previously read from magnetic tape.

Electronic computer systems can operate most efficiently when the information to be processed is available on magnetic tape. Prior to the development of the machine of the invention, two machines - a card punch and a key verifier - have usually been used to record information in computer systems. In the data recorder to be disclosed herein business and scientific data can be manually recorded and verified on magnetic tape without the need for any intermediate medium.

Very briefly, the data recorder of the invention includes a keyboard which permits entry of 63 different character codes, including alphabet, numerics and special characters. The output media is in the form of a seven channel magnetic tape, and up to 80 data characters can be recorded in each unit record. A magnetic core memory is used to store data to be recorded in a unit record during a recording run, and also to store program patterns. In the entry mode, keyed data is entered into memory, until the machine is signalled that the data record is complete. The data is then read (but not erased) from memory and written on the tape after which the tape is backspaced the length of the record just written and the record is read from the tape and compared with the data as it is in memory. In the verify mode, a unit record of data is entered into memory from the tape being verified. The verify operator then transcribes data from the source media and as each character is entered it is compared with the information in memory. Any difference is signalled to the operator.

It is very important in a system of this type that a semi-skilled operator be capable of easily learning the operation of the machine and of operating it day in and day out reliably with a minimum amount of supervision. It is further necessary that the machine be as inexpensive to manufacture as possible.

It is therefore an object of the present invention to provide for a data recorder an improved, low cost, reliable, easy to operate tape handling system with a simplified structure for backspacing the tape whereby precise movement is attained.

Other objects and advantages of the data recording machine of the invention will become apparent from the following detailed description thereof, read in conjunction with the accompanying drawings which disclose the principles of the invention and a preferred means for carrying them out.

Figure 1:
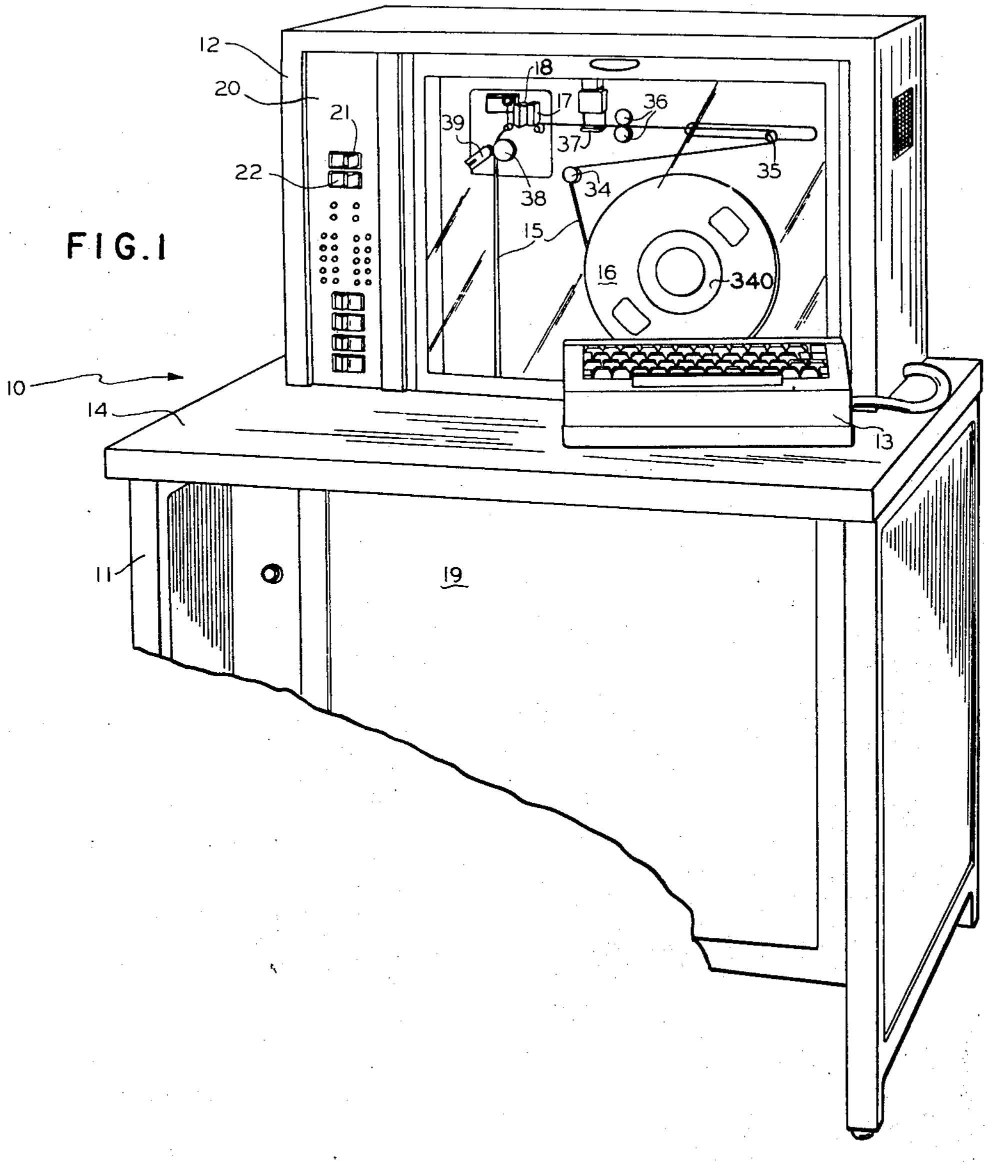
FIG. 1 is a fragmentary front perspective view of a data recording machine embodying the invention.

As already noted, the data recorder of the invention is characterized by its ability to record information on tape and verify information from tape. The machine is generally indicated by the reference number 10 in FIG. 1 and includes a lower desk portion 11, and a tape cabinet 12 mounted thereon. The desk portion is arranged so that the operator can sit in front of the machine comfortably and operate the keyboard 13 which is contained in a movable unit for operator comfort. The keyboard unit is supported as shown on the desk top 14 which also has ample room for the source media.

In the entry mode of the machine, data which has been entered into memory from the keyboard is thereafter read from memory and written on tape which is shown at 15 in FIG. 1, the tape being supplied from a reel 16 mounted in the tape cabinet 12.

The tape 15 used in the machine is seven channel magnetic computer tape and the supply reels 16 are of a standard type. In each frame on the tape, six of the channels will reflect the six BCD code data bits for the character being recorded while the seventh channel will show a parity bit, the recording being done in either even or odd parity. The recording is at a density of 200 bits per inch with fixed length data blocks, or data records, of 80 data characters plus a longitudinal parity character. These records are separated by an inter-record gap of a nominal 0.75 inch. The tape path, FIG. 1, leads past an erase head 17, a read-record head 18 and from thence into a storage bin not shown in FIG. 1, but located in an enclosed portion 19 of the desk 11 beneath the tape cabinet.

The tape 15 extends from reel 16, FIG. 1, around a guide roller 34, a second guide roller 35 mounted on a tension arm and then between the rollers 36 of a backspace mechanism. From the backspace mechanism, the tape passes through a pressure pad mechanism 37, under the erase head 17 and read-record head 18, and then between drive capstan 38 and pinch roll 39, the mechanical operation of these components to be described hereinafter. Forward movement of the tape is effected by moving the pinch roll 39 into engagement with the rotating capstan which causes the tape to be accelerated to a nominal velocity of 31 inches per second. At the completion of a recording run, the tape is rewound on the supply reel 16 by setting the pressure pad mechanism 37 to REWIND, turning the power switch 21 to OFF and the rewind switch 22 to ON. When the tape has been completely rewound on the supply reel, the rewind switch must be manually turned to the OFF position.

In the entry mode, the tape is moved in the forward direction and passes under the erase head 17 before passing under the read-record head 18. The erase head operates to completely erase the tape and thereby prevent low level noise which might occur due to variations in track widths or to track misalignment. In the verify mode, on the other hand, no erasure occurs during forward movement of the tape. The tape can be manually backspaced by depressing the tape backspace key which causes the backspace rollers 36 to move the tape backward a nominal 1.125 inch.

Figure 2:
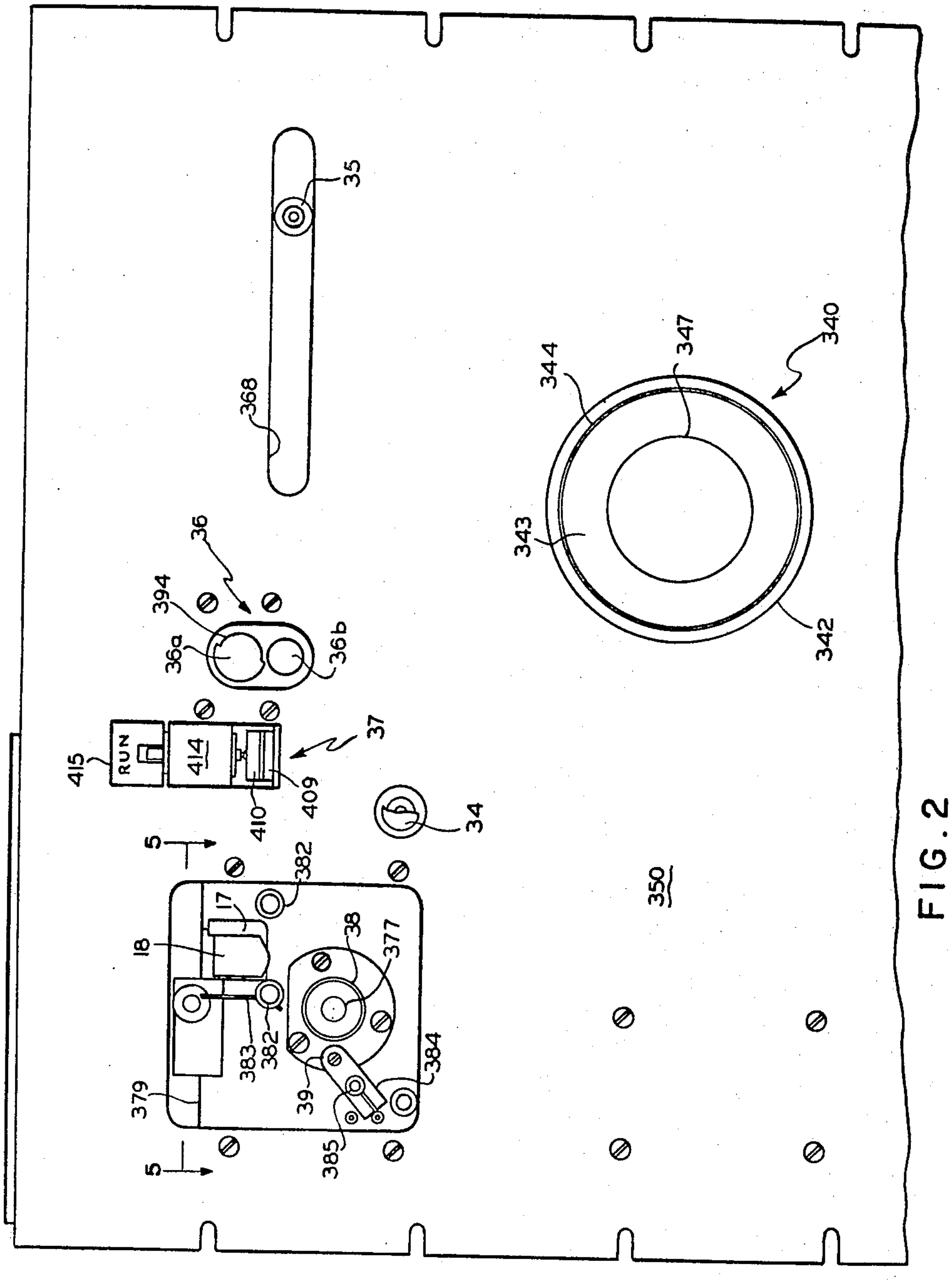
FIG. 2 is a front elevation of the tape deck wall and components mounted thereon.
Figures 4, 7, 8, 9:
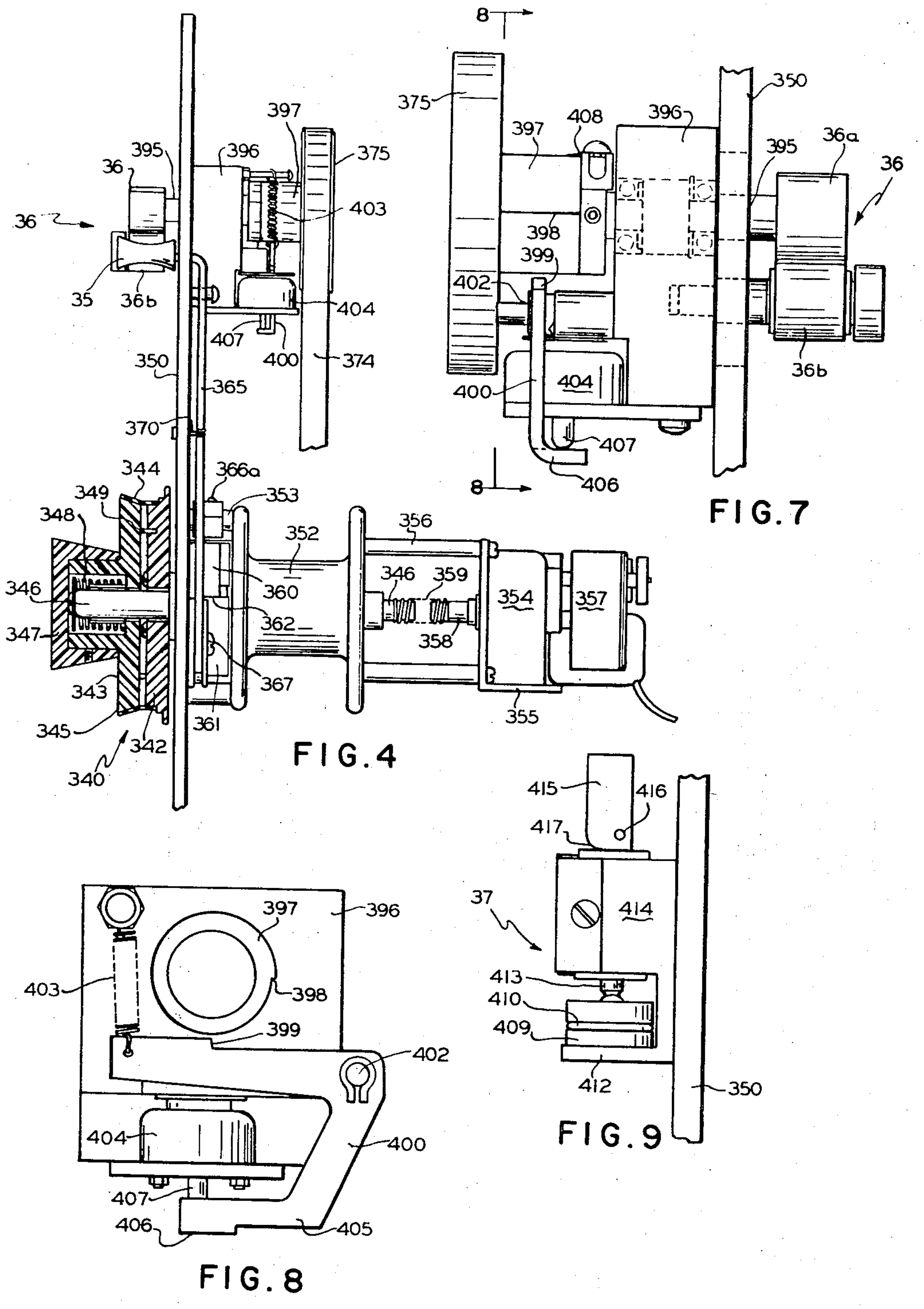
FIG. 4 is an end elevation, partly in section, of the tape deck wall looking from the left in FIG. 3, the part in section being taken substantially along line 4—4 of FIG. 3.
FIG. 7 is a side elevation of the backspace mechanism sub-assembly as viewed from the direction of line 7—7 in FIG. 3.
FIG. 8 is a rear elevation of the backspace mechanism with the backspace pulley removed.
FIG. 9 is a right side elevation of the tape pressure mechanism.

The tape reel is removably mounted on a circular holder 340, FIGS. 2 and 4. As may be seen in FIG. 4, where the reel itself is not shown, the holder is comprised of a backing plate 342, a locking plate 343 and a band 344 of resilient material such as rubber which engages the edges of the two plates as shown. The edge of the locking plate tapers outwardly and at its point 345 of maximum diameter, with the band 344 encircling it, it is slightly larger than the center opening of a standard reel. The locking plate is movable axially on shaft 346 and when it is pulled outwardly by means of knob 347, compressing an interior spring 348, its outer edge 345 moves away from the outer edge of the band 344 so that the latter can contract to an overall diameter that is slightly less than that of the plate outer edge. This enables the tape reel to be slipped past the plate edge 345 and onto the holder where it will be held in place by permitting the locking plate to return to its inner position shown in FIG. 4.

Locking plate 343 is provided with pins 340 which are normally received with a free fit in corresponding holes in backing plate 342. The length of these pins is such that when the locking plate is pulled out to mount or demount a reel, the pins are completely withdrawn from the holes and the plate can be turned slightly to move the holes and pins out of registry whereby the pins hold the plate in the outer position.

The shaft 346 turns freely with the reel holder when the tape is being drawn off the reel and operates as a drive shaft when rewinding. The shaft extends through the tape deck wall 350; and on the back side thereof it is supported by a bearing housing 352 that is secured in spaced relation to the wall by a plurality of posts 353. A motor 354 for rewinding the tape is mounted on a bracket 355, the bracket being connected to the bearing housing by stand-off posts 356. The motor is provided with a clutch 357 and its shaft 358 is connected to shaft 346 by a torque converter spring 359.

A brake drum 360 is fixed on shaft 346 just behind the wall 350 and a brake band 361, having a looped end 362 mounted on one of the posts 353, passes partially around the drum. The free end 363 of the band is connected through a tension spring 364, FIG. 3, to the tension arm 365. A spring finger 366, supported by a bracket **366*a* mounted on a post 353, bears against the free end of the brake band as shown so that the band maintains engagement with the brake drum even when the upper end of the tension arm moves toward the right as viewed in FIG. 3. The tension arm is pivotally connected to the tape deck wall at 367 and its upper end extends through a slot 368 in the wall and carries the tape guide roller 35. As best shown in FIG. 4, roller 35** has an hour glass configuration whereby the tape is self-centering with respect to it.

Figure 3:
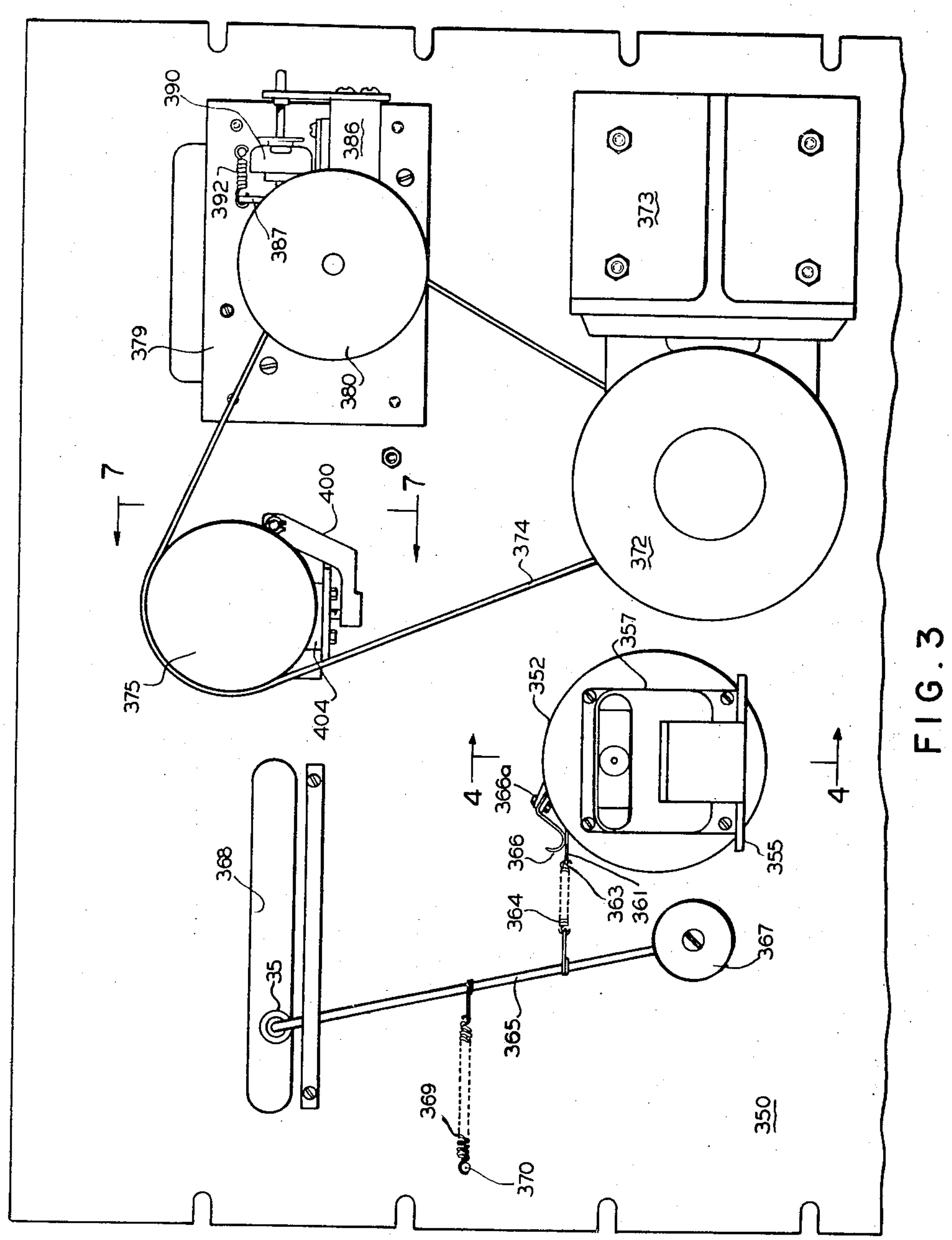
FIG. 3 is a rear elevation of the tape deck wall.

A second tension spring 369 extends from the tension arm to a post 370 and biases the upper end of the arm toward the left as viewed in FIG. 3. This cooperates with the brake band 361 to keep the proper amount of tension on the tape at all times as it is being drawn off the reel. Thus, if the pull on the tape at capstan 38 starts to become excessive, this will cause roller 35 to move toward the right (FIG. 3) thereby slackening the pull on the brake band so that the tape reel will turn more easily. Conversely, if the pull on the tape is relatively light, spring 369 will have more effect and will cause roller 35 to move toward the left; this tightens the brake band on the brake drum so that the tape reel turns less easily.

The tape is unwound or drawn from the reel by moving the pinch roll 39 into engagement with the rotating capstan 38 with the tape positioned therebetween. The capstan rotates continuously while the machine is on, and it is driven by a motor 372 mounted on the back of the tape deck wall 350 by means of a bracket 373, FIG. 3. The motor shaft carries a pulley (not shown) that drives a timing belt 374 and the latter drives a back-space mechanism pulley 375 and a capstan pulley 376, see FIG. 5. The capstan pulley is fixed on a shaft 377 that is journalled in a bearing block 378 forming a part of the capstan sub-assembly shown in FIG. 5.

The block 378 is carried by a head plate 379 that is mounted in an opening in the tape deck wall 350, FIGS. 2 and 3, and shaft 377 carries capstan 38 on the front side of the head plate. Behind pulley 376, shaft 377 carries a flywheel 380 which is provided to dampen any motor jitter there might be. The flywheel also enables immediate response to the pinch roll action because its weight evens out the load.

Figure 5:
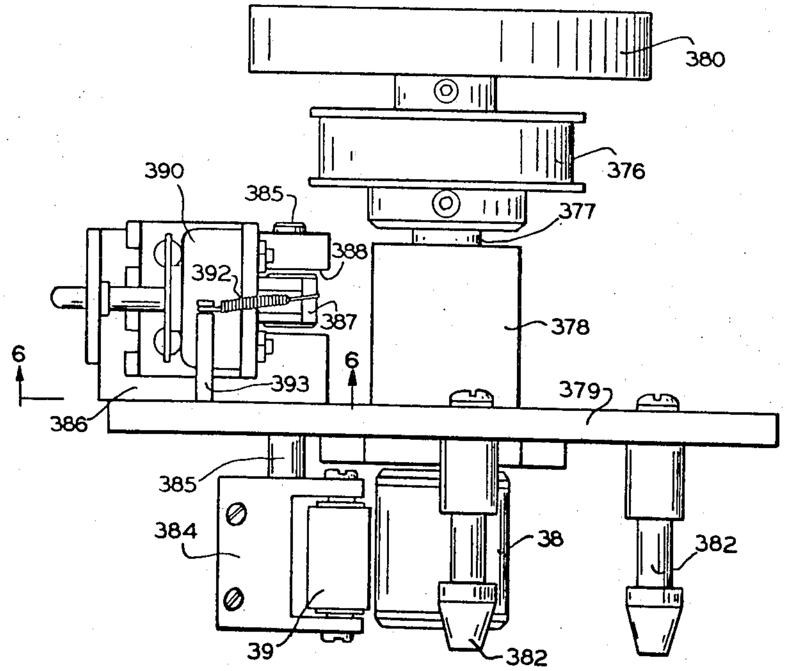
FIG. 5 is a top plan view of the capstan sub-assembly.

Above the capstan, as shown in FIGS. 2 and 5, are two fixed tape guides 382 which hold the tape in engagement with the erase and read-record heads 17, 18. A spring steel finger 383 bears against the left hand guide to minimize the possibility of having a tape loop form between the read-record head and capstan. This finger can be moved out of engagement with the guide when threading the tape.

Figure 6:
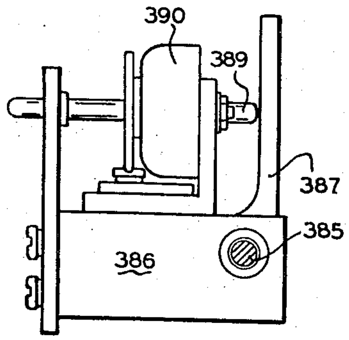
FIG. 6 is a vertical section through the capstan subassembly taken substantially along line 6—6 of FIG. 5.

The pinch roll 39 is rotatably mounted in a holder 384 that is fixed on a rocker shaft 385, the shaft passing through the head plate 379 and being journalled in a bearing block 396 mounted on the back of the plate. An upstanding rocker arm 387, FIGS. 5 and 6, is fixed on the rocker shaft in a bifurcated portion 388 of the bearing block, and this arm is engaged by the plunger 389 of a commercially available actuator 390 such as a Ledex actuator, a linear solenoid. A spring 392 extending from the top of arm 387 to a post 393 holds the pinch roll out of engagement with the capstan when forward movement of the tape is not called for. When forward movement is called for, a signal is received by the actuator which causes its plunger 389 to rock arm 387 in a clockwise direction (as viewed in FIG. 6) and press the pinch roll into engagement with the capstan.

The backspace rollers 36, FIGS. 2 and 7, are arranged to move the tape backward a distance of 1.125 inch upon receipt of a signal, as previously described. To this end, the upper, drive roller **36*a* which is made of steel has a relieved area 394 whereby only 191° of the roller's surface can engage the tape. The lower roller 36*b* is made of urethane and is simply a follower. Roller 36*a* is fixed on a shaft 395 that is journalled in a bearing block 396 mounted on the back of the tape deck wall. The shaft extends back from the bearing block and into a spiral cam 397, FIGS. 7 and 8, forming a part of a commercially available wrap spring clutch. This clutch is operably connected on its opposite side to the backspace pulley 375 driven by motor 372, FIG. 3.**

Pulley 375 turns continuously as described above, and can be made to drive shaft 305 through a conventional wrap spring (not shown). However, the wrap spring is normally prevented from driving the shaft by cam 397 which is connected to one end of the spring. This is accomplished by preventing rotation of the cam through engagement of its shoulder 398 with a shoulder 399 on a rocker arm 400, FIG. 8. The rocker arm, which is pivotally connected to the bearing block at 402, is normally biased into engagement with the cam shoulder by a spring 403.

The rocker arm can be moved out of engagement with the cam shoulder by a counter clockwise rotation of the arm, this being effected by a solenoid actuator 404 such as actuator 300 described above. To this end, the arm has a lower extension 405 provided with a horizontal flange 406 that underlies the actuator plunger 407. When the backspace signal is received by the actuator, its plunger moves downward just long enough to rock the rocker arm and permit cam 307 to be rotated by means of the wrap spring clutch.

Since the plunger is retracted almost immediately, the rocker arm is rotated in the opposite direction by spring 403 and its shoulder is in position to stop the cam after one complete revolution thereof. The roller 36*a*, therefore, also makes one complete revolution with its non-relieved surface portion engaging the tape long enough to backspace it the required distance. A tab limit stop device 408 is operably connected to an end of the wrap spring and coacts with the clutch mechanism in a well-known manner.

Located between the backspace rollers 36 and capstan 38 is the pressure mechanism, generally designated 37 in FIGS. 2 and 9. This mechanism is mounted on the front of the tape deck wall 350 and is provided to help maintain proper tension on the tape. To this end, the tape passes between a flat cork pad 409 and a flat steel plate 410 which are resiliently biased towards one another. The cork pad is biased upwardly by a spring (not shown) located between the pad an an underlying support shelf 412. The amount of downward pressure exerted by plate 410 can be regulated by means explained just below.

The plate 410 has a ball and socket connection with the lower end of a rod 413 which extends up through the pressure mechanism housing 414 and is connected at its upper end to an operating tab 415. The connection comprises a small pin 416 which passes through the rod normal to its axis so that the tab can be swung forwardly relative to the rod, or in the counter clockwise direction as viewed in FIG. 9. The lower front edge 417 of the tab is formed with a radius which permits such movement, it being possible to move the tab to a position at right angles to the position shown in FIG. 9. Since the pin 416 is located slightly closer to the back than to the front of the tab, movement into its extreme forward or right angle position causes the rod to be raised slightly so that the pressure between pad 409 and plate 410 is reduced. The raising of the rod compresses a spring (not shown) within the housing 414, and this spring urges the rod to return to its lower position as soon as movement of the tab towards its upright position is initiated.

During the normal forward and backward movement of the tape, tab 415 is positioned in its upright position whereby the maximum pressure that is provided for by the mechanism is exerted on the tape. When the tape is being rewound on the reel, however, less pressure is required and the tab is moved to its full forward or right angle position.

From the foregoing description, it will be apparent that the data recorder of the invention provides a novel and highly useful machine that is capable of performing in a versatile yet very efficient manner. As will be understood by those familiar with the art, the invention may be embodied in other specific forms without departing from the spirit or essential characteristics thereof. The embodiment disclosed is, therefore, to be considered in all respects as illustrative rather than restrictive, the scope of the invention being indicated by the appended claims.

What is claimed is:

1. A mechanism for selectively moving a web, said mechanism comprising:

a. an idler roller disposed adjacent one side of said web;

b. a second roller disposed adjacent the other side of said web opposite to said idler, said second roller having a first portion on its circumference normally facing said web and constructed so as not to engage said web, said second roller having a second portion on its circumference so constructed as to frictionally engage said web between itself and said idler when said second roller is rotated to move said web;

c. continuously rotating drive means;

d. clutch means connecting said drive means with said second roller, said clutch means comprising:

i. means for normally preventing rotation of said second roller, said preventing means comprising a shouldered cam, means connecting said cam and said second roller, a movable member and means normally biasing said member into blocking engagement with said cam; and ii. actuating means for momentarily moving said member out of engagement with said cam.

2. The mechanism as recited in claim 1 wherein said first portion on the circumference of said second roller is relieved and said second portion on the circumference is unrelieved.

3. The mechanism as recited in claim 2 wherein both said relieved and unrelieved portions are on circular arcs.

4. The mechanism as recited in claim 1 wherein operation of said actuating means operates to rotate said second roller through a single turn, said first and second portions on the circumference of said second roller make up all of said second roller's circumference, and said unrelieved portion has a predetermined length whereby the web is moved an increment of predetermined distance proportionate to said predetermined length upon each operation of said rotating means.

5. The mechanism as recited in claim 1 including means for normally moving said web in one direction and wherein operation of said actuating means rotates said second roller to move said web an increment in the opposite direction.

6. The mechanism as recited in claim 1 wherein said movable member of said rotation preventing means is a rocker arm and wherein said actuating means is a solenoid operable to move said rocker arm.

* * * * *

UNITED STATES PATENT OFFICE
CERTIFICATE OF CORRECTION

Patent No. 3,807,614 Dated April 30, 1974

Inventor(s) George R. Cogar et al

It is certified that error appears in the above-identified patent and that said Letters Patent are hereby corrected as shown below:

At column 1, line 9, change "Mar. 30" to --Mar. 3--.

Signed and sealed this 1st day of October 1974.

(SEAL)
Attest:

McCOY M. GIBSON JR.
Attesting Officer

C. MARSHALL DANN
Commissioner of Patents